United States Patent Office 3,302,240
Patented Feb. 7, 1967

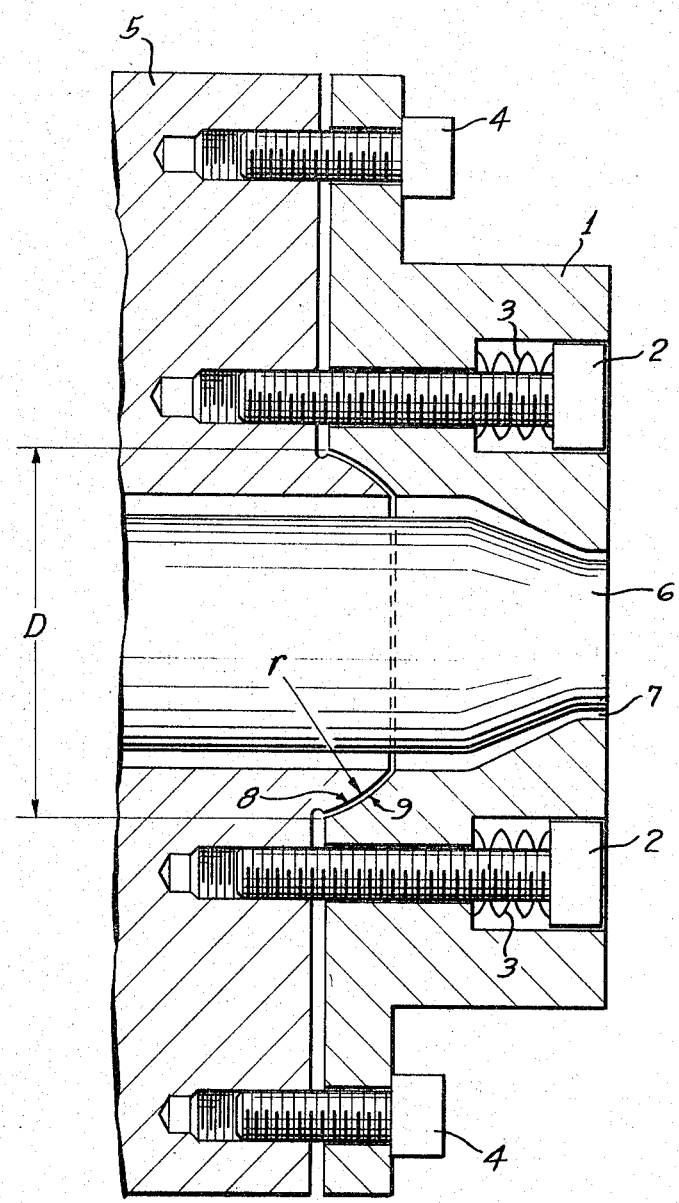

3,302,240
ANNULAR NOZZLES FOR THE EXTRUSION
OF THERMOPLASTIC MATERIALS
Diether Loos, Wiesbaden-Biebrich, Germany, assignor to Kalle Aktiengesellschaft, Wiesbaden-Biebrich, Germany
Filed Aug. 25, 1964, Ser. No. 391,861
Claims priority, application Germany, Aug. 27, 1963,
K 50,657
3 Claims. (Cl. 18—12)

This invention is concerned with improvements in and relating to annular nozzles for the extrusion of thermoplastic materials.

Piping and tubing is manufactured from thermoplastic material with the use of annular nozzles which are adjusted or centered by means of a setting ring or sleeve attached to the main body of the nozzle and provided with set screws located at right angles relative to the annular nozzle aperture. To enable the nozzle aperture to be adjusted or centered relative to the rigid nozzle core while the extrusion machine is running, the nozzle sleeve is displaced on a plane sealing surface against the sealing pressure. This method of adjustment requires considerable force to be used and has the disadvantage that set screws and mating threads are often damaged or even stripped. The necessary repair always involves a time-consuming dismantling operation of other, or all, of the components of the nozzle. This type of nozzle adjustment is comparatively crude and inaccurate.

The present invention provides an annular nozzle for the extrusion of annular articles of thermoplastic material, the nozzle having a relatively fixed core and a first annular outer member or body providing between them a channel for conducting the molten thermoplastic material towards an annular nozzle aperture which is provided between the core and a second annular outer member or sleeve attachable to the first, the two annular members having mating contact surfaces of spherical annular form of the same radius which is greater than half the maximum diameter of contact of the surfaces, being attached together by bolts having their head ends resiliently held in the second annular member and being rotatable relative to one another for adjustment of the aperture with locking bolts being provided for locking them in an adjusted position. With this nozzle construction, the aforementioned disadvantages are avoided. Instead of a plane sealing face, the nozzle of the invention has a spherical sealing face. As resilient means, for example, coil springs or preferably corrugated or dished spring washers are provided under the heads of the attachment bolts. The springs provide an adequate sealing pressure and at the same time render the adjustment of the nozzle sleeve sufficiently resilient.

The locking bolts for the nozzle sleeve are advantageously positioned parallel to the direction of the aperture. After loosening these bolts, a very slight force is sufficient to permit the nozzle sleeve to revolve slightly about the spherical sealing face of the body with respect to the stationary core. This enables the aperture to be re-centered while the extrusion is running and, in addition, the very slight force needed to adjust the aperture ensures much greater operational safety. Furthermore, much more accurate adjustment of the aperture can be made, whereby the uniformity of the wall thickness of pipes, tubes or hollow ware to be manufactured is improved. If desired, the aperture adjusting means can be made even more sensitive by using locking bolts with fine threads. It is another advantage of the use of this type of bolt that a special setting ring for the bolts, as required with the known devices, can be dispensed with.

A nozzle construction according to the invention is particularly suitable for making piping and tubing of circular cross-section, but it can be used with equal advantage for nozzles used in shaping hollow ware of any desired cross-section, including non-circular nozzles.

The invention is further illustrated in the accompanying drawing of which the single figure is a longitudinal section of the extrusion end of one embodiment of a nozzle according to the present invention.

Referring to the drawing, a nozzle sleeve 1 is attached to a nozzle body 5 by means of four or more attachment bolts 2 under the head of each of which there is a sufficient number, for example ten, dished spring washers 3. A spherical annular sealing face 8 of the body and a mating face 9 of the sleeve allow a relative rotary movement, with reference to the nozzle core 6 or the longitudinal axis of the nozzle, so that it is easy to adjust or center the nozzle aperture 7 by tightening or loosening the bolts 4. The radius $r$ of the spherical faces and the external diameter $D$ of the sealing face are in the relation $r > D/2$.

It will be obvious to those skilled in the art that many modifications may be made within the scope of the present invention without departing from the spirit thereof, and the invention includes all such modifications.

What is claimed is:
1. An adjustable annular nozzle for use in the extrusion of annular articles of thermoplastic material comprising a fixed core, a first annular body member forming a channel around the core, a second annular body member having a mating channel therein and being connected to the first body member through resilient connecting means, the two body members having mating contact surfaces in the shape of a portion of a sphere the radius of which is greater than half the maximum diameter of the contact surfaces, and means for locking the two body members in an adjusted position.

2. An adjustable annular nozzle according to claim 1 in which the resilient connecting means comprises bolts having spring means mounted between the heads thereof and the second body member.

3. An adjustable annular nozzle according to claim 1 in which the means for locking the two body members in an adjusted position comprises locking bolts.

References Cited by the Examiner
UNITED STATES PATENTS 2,461,856  2/1949  Tornberg _____ 18—12
2,562,565  7/1951  Merk _____ 72—465
3,184,792  5/1965  Commisso _____ 18—12 X WILLIAM J. STEPHENSON, *Primary Examiner.*